Dec. 25, 1951    M. MABRY    2,580,110
ROTARY TOOL CARRYING TRACTOR ATTACHMENT DEVICE
Filed May 17, 1948    2 SHEETS—SHEET 2
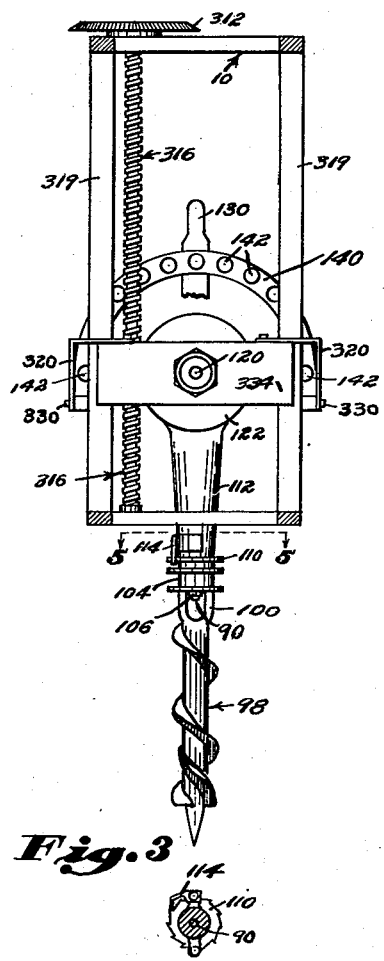
Fig. 3
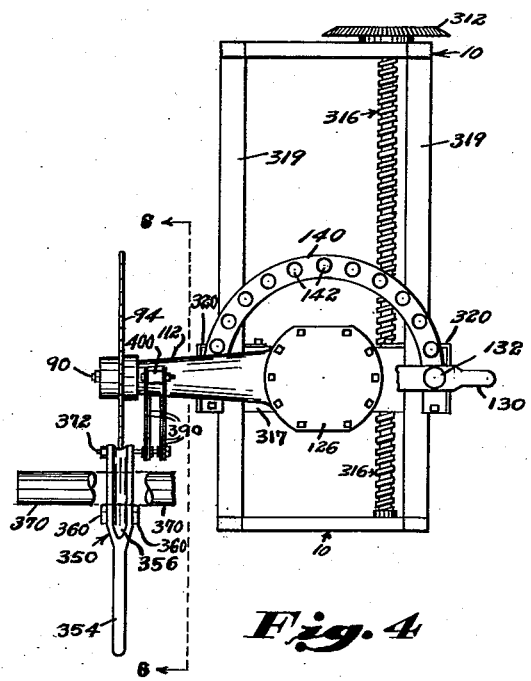
Fig. 4
Fig. 5    Fig. 6
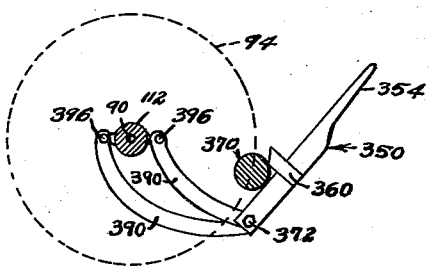
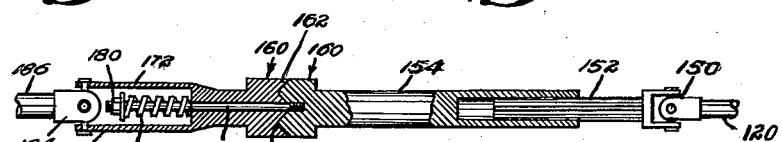
Fig. 7
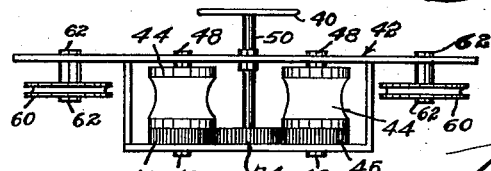
Fig. 8
Inventor
Melvin Mabry
By Arthur H. Sturges
Attorney Patented Dec. 25, 1951

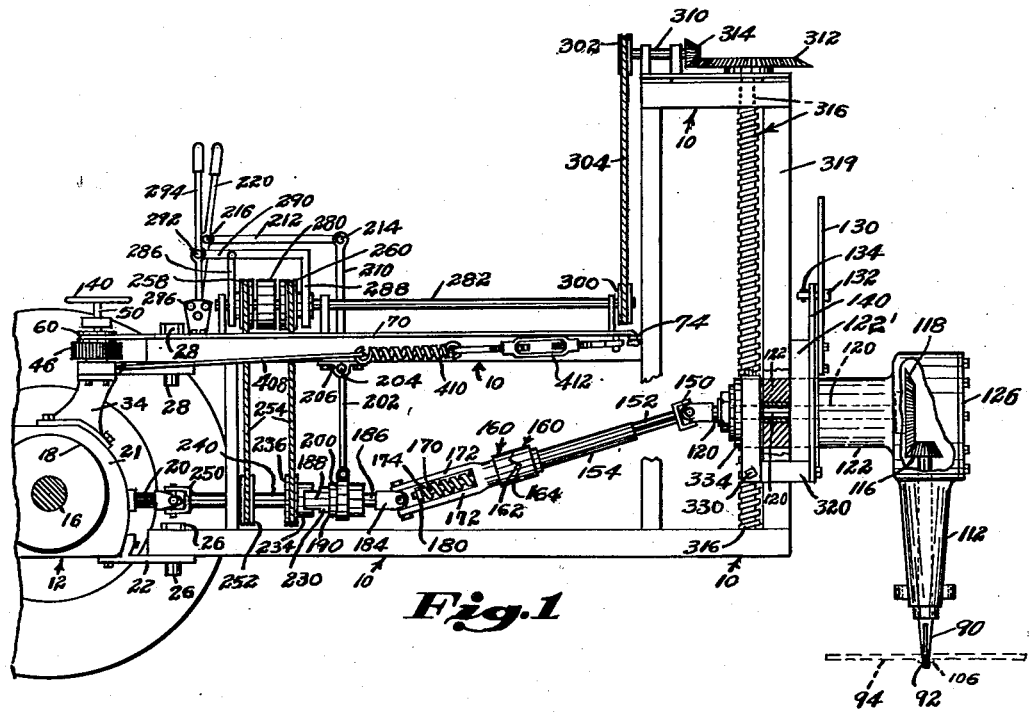

2,580,110

UNITED STATES PATENT OFFICE 2,580,110

ROTARY TOOL CARRYING TRACTOR ATTACHMENT DEVICE

Melvin Mabry, Elmer, Mo.

Application May 17, 1948, Serial No. 27,572

4 Claims. (Cl. 143—43)

This invention relates to a tractor attachment assembly and more particularly it is an object of the invention to provide a versatile assembly for attachment to the power take-off shaft of a tractor for utilizing the power of the latter for drilling.

Another object of the invention resides in the provision of an assembly as described which is adapted to mount a rotating shaft in a position for swinging movement in a vertical plane.

Still a further object of the invention resides in the provision of an assembly as described which is adapted to move a shaft rotatably secured thereto, in upward and downward directions as desired.

Yet another object of the invention resides in the provision of an assembly for the purposes described which includes a frame swingably mounted for permitting the swinging of a rotatable shaft secured thereto in a wide horizontal arc.

A particular object of the invention is to provide an assembly as described which includes a slip clutch in the power transfer portions thereof for preventing breakage of tools employed at times when the latter strike objects which prevent their rotation.

Yet another object of the invention is to provide a device for the purpose described which is sturdy and durable in construction, reliable and efficient in operation, and relatively simple and inexpensive to manufacture, assemble and utilize.

Other and still further objects and advantages of the invention will become apparent from the following detailed description of a preferred embodiment thereof.

In the drawings:

Figure 1 is a side elevation of the assembly of the invention shown as secured to the rearward end of a tractor; one rear wheel and a portion of the tractor axle as well as forward portions of the tractor and also a portion of the gear housing and a portion of the frame of the assembly being broken away; and other portions of the tractor and assembly showing in section; a circular saw sometimes employed being shown in dotted lines;

Figure 2 is a top plan view of the tractor and assembly as shown in Figure 1, both rear wheels of the tractor here being shown, a portion of a gear housing and a portion of a drum bracket being broken away;

Figure 4 is a rear elevation of a portion of the assembly showing the tool attachment shaft disposed in a horizontal plane with a circular saw blade secured thereto, a log sawing guide of the invention being shown as secured to the tool attachment shaft housing, a log being shown in a position of preparedness for a movement of the log sawing guide preparatory to cutting, a portion of the log being broken away and other portions being shown in dotted lines;

Figure 5 is a view-in-section taken along the line 5—5 of Figure 3 and showing a ratchet and pawl mechanism employed during wire stretching operations;

Figure 6 is a view-in-section taken along the line 6—6 of Figure 4, a circular saw employed being shown in dotted lines;

Figure 7 is a detailed view of a slip clutch mechanism and slidable rotation transfer connection employed, certain portions thereof being broken away and other portions being shown in section; and Figure 8 is a detailed frontal elevation of a drum mechanism for controlling frame swinging movements.

The tractor attachment assembly of this invention includes a frame having upper and lower horizontally disposed sections, generally designated by the numeral 10. The frame 10 is pivotally secured to a tractor, generally indicated at 12.

The tractor 12 includes two rear wheels 14, a rear axle 16, a rear axle housing 18, a power take-off shaft 20, and a transmission housing 21.

The forward end of the frame 10 is pivotally secured by means of a bracket 22 and a king pin 26 to the lower rearward side of the transmission housing 21.

The forward, upper end of the frame 10 is secured by means of a king pin 28 to a mounting bracket 30, and the latter is in turn secured by means of two standards 34 to the upper, rearward end of the transmission housing 21. The pins 26 and 28 are directly, axially aligned and disposed one above the other.

Means are provided for causing the frame 10 to swing about the pins 26 and 28 in a horizontal plane.

Such means include a hand control wheel 40 best seen in Figure 8. The control wheel 40 is disposed on a shaft which latter is rotatably received through a mounting member 42, which latter also rotatably supports two drums 44.

Each of the drums 44 is provided with a gear 46 secured thereto. The gears 46 and drums 44 are rotatably disposed about shafts 48. On the lower end of the shaft 50, to which the hand wheel 40 is secured, a gear 54 is rigidly secured thereto, the gear 54 being disposed in mesh with the spaced apart drum-gears 46.

Also mounted upon the drum-mounting member 42 are two pulleys 60 spaced apart transversely with respect to the tractor and disposed on opposite sides of the drums 44. The pulleys 46 are rotatably secured to the mounting member 42 by means of suitable axle bolts 62.

The drum mounting member 42 is elongated and is disposed transversely with respect to the tractor 12 and secured to the upper sides of the standards 34.

Two cables 70 are secured to the drums 44 and are wound thereabout. The free ends of the cables 70 are reeved across the pulleys 60 respectively. The free ends of the cables 70 then extend rearwardly to and are secured to suitable ears 74 on the rearward end of the frame 10.

As thus described a rotation of the hand wheel 40 will cause a rotation of the drums 44 in opposite directions with respect to each other, causing swinging movements of the frame 10 in a horizontal plane.

A tool attachment shaft 90 having a threaded lower end 92 is provided to which a circular saw, shown in dotted lines at 94 in Figure 1, may be secured.

A post hole auger or drill 98, having a bifurcated upper end 100, to which the threaded lower end of the shaft 90 may be secured, is also adapted for use in lieu of the saw 94.

If desired, the auger 98 may be a combination tool having a wire winding drum 104 secured to its upper end so that when a combination drill 98 is secured to the shaft 90 by means of the nut 106, the drum 104 may be used for drawing fence wire taut.

To facilitate the latter operation, a ratchet mechanism, best shown in Figure 5, is provided. The latter includes a ratchet or ratchet wheel 110 rigidly secured to the drum 104 for rotation therewith. The drum 104, as well as the ratchet wheel 110 rotate with the shaft 92 as the latter rotates in a housing 112.

A pawl 114 is provided and is pivotally secured to the housing 112 for engagement with the teeth of the ratchet wheel 110. The pawl 114 is without a spring because in use the drum 104 is horizontally disposed whereby the pawl will be caused to engage the ratchet wheel 110 by force of gravity.

At its upper end, the shaft 90 is secured to the bevel gear 116 and the latter is disposed in mesh with a bevel gear 118, to which latter a shaft 120 is secured. The shaft 120 is normally, horizontally disposed and is provided with a horizontal housing 122, which latter is adjoined to the head of the housing 112, a removable plate 126 being provided on the rearward side of the head at the junction of the housings 112 and 122 permitting access to the bevel gears 116 and 118.

The housing 122 is rotatably slidably held by the frame 10 in a manner later described and is provided with a rearward portion rotatably secured to a forward portion thereof for rotation in a manner for swinging the shaft 90 in a vertical plane transversely of the shaft 120 and for this purpose a lever 130 is provided, the latter being rigidly secured at one end to the housing 122 and being provided with a handle at its free end.

Between the secured and free ends of the lever 130 a bolt 132 is disposed through the lever 130. The bolt 132 is provided with a cotter pin 134 on one end thereof and a head on the other end thereof. The purpose of the bolt 132 is for securing the lever 130 in any one of a plurality of positions transversely of a semi-circular bracket 140, the latter being rigidly secured to the frame 10 at its ends.

The housing 122 is provided with an enlarged section 122' between the bracket 140 and a cross head 317.

The bracket 140 is provided with a plurality of spaced apart apertures 142 for the purpose of receiving the bolt 132 to lock the shaft 90 in any one of a plurality of positions in a vertical plane.

The shaft 120 extends forwardly out of the housing 122 and is attached by means of a universal joint 150 to a rod 152 which latter is provided with longitudinal ridges or splines.

The rod 152 is slidably disposed in a sleeve 154 and the latter is provided with a longitudinally grooved or splined opening therethrough for slidably receiving the splined rod 152 in a manner whereby the rod 152 is slidable in and rotated by the shaft or in sleeve 154.

A slip clutch or crown clutch mechanism is provided and is secured to the sleeve 154. The crown clutch mechanism includes two members 160 having oppositely disposed irregular surfaces which are complemental to each other for overlapping.

The said surfaces are provided with alternate crowns 162 and recesses 164 as best seen in Figure 1. One of the members 160 is provided with a central opening therethrough for receiving a rod or elongated member 170, which latter is secured at one end to the other crowned clutch member 160.

Preferably, the rod 170 is axially aligned with the sleeve 154. That crowned member 160 which is provided with the aperture is further provided with two oppositely disposed, elongated ears 172, which are disposed spaced apart for receiving therebetween the rod 170 and a compression spring 174, which latter is disposed about the rod 170 and is held in compression against the apertured slip clutch member 160 by means of a nut 180, which latter is disposed on the end of the rod 170.

The forward ends of the ears 172 are secured to a universal joint 184 and the latter is in turn secured to a shaft 186.

The shaft 186 is square in cross-section and is slidably disposed in a square opening, not shown, in a dog 188. The dog 188 and the shaft 186 are thereby slidably, but not rotatably, disposed with respect to each other.

The outer circumference of the dog 188 is generally cylindrical and a bearing sleeve 190 is provided for extending about the dog 188. A collar 200 is provided and is rigidly secured to the bearing 190.

The collar 200 is pivotally secured to a rocker arm 202 which latter extends upwardly and is pivotally mounted on the frame through a horizontally disposed shaft 204, which latter is rotatably mounted on the frame 10 in bearings 206.

Spaced transversely from the rocker arm 202, an arm 210 is provided extending vertically upward from the shaft 204 and rigidly secured thereto so that movements of the arm 210 will be transferred to the shaft 204 and to the rocker arm 202 for moving the bearing 190 along the shaft 186 thereby disengaging the shaft 186 from the shaft 240.

At the upper end of the arm 210 a horizontally disposed link 212 is pivotally secured thereto at 214, the link 212 extending forwardly with respect to the tractor 12. The forward end of the link 212 is pivotally secured at 216 to a hand lever 220, which latter is pivotally secured to the frame 10. The hand lever 220 is disposed in a vertical plane and is adapted to pivot with respect to the frame 10 in a vertical plane, longitudinally disposed with respect to the frame 10.

The dog 188 is provided with an annular ring or protrusion 230 extending therearound. The bearing 200 is adapted to engage the protrusion 230 on the rearward side thereof at desired times in response to operation of the lever 220 for causing the dog 188 to move forwardly on the shaft 186 and away from the universal joint 184.

The forward end of the dog 188 is preferably rectangular in vertical cross-section and the said forward end is adapted to be snugly received in a slot in the rearward side of a slotted clutch member 234. A pulley wheel 236 is rigidly secured to the slotted clutch member 234. The pulley wheel 236 is disposed on the tractor side of the slotted clutch member 234.

The pulley wheel 236, the slotted clutch member 234 and the dog 230 are all provided with aligned apertures therethrough for receiving a round shaft 240, the latter extending rearwardly only partway through the dog 230.

The shaft 240 extends toward the tractor 12 and is secured rigidly to the power take-off shaft 20 of the tractor by means of a suitable universal joint 250.

Between the pulley 236 and the universal joint 250, another pulley 252 is provided. The pulleys 236 and 252 are each provided with belts 254 extending upwardly therefrom and disposed about two upper pulleys 258 and 260. The belt 254 extending from one of the lower pulleys 236 is preferably crossed and the belt 254 extending from the pulley 252 is not crossed.

The pulleys 258 and 260 are provided with oppositely disposed clutching surfaces. A clutch plate or clutching wheel 280 is provided and is disposed between the pulleys 258 and 260. The clutching wheel 280 is rigidly secured to a shaft 282, which latter extends longitudinally of the frame 10 and is rotatably secured thereto.

The pulley wheels 258 and 260 are themselves slidably secured about the shaft 282. Each pulley 258 and 260 is provided with a slot around a hub thereof, said slots being disposed on the other side of the pulleys from their clutching surfaces, or, in other words, disposed away from the clutch plate or wheel 280.

Two fingers 286 and 288 are provided, the latter extending vertically upward from and being disposed in the slots of the pulleys 258 and 260. The fingers 286 and 288 are secured to a horizontal arm 290 in spaced apart relation with respect to each other. The arm 290 extends longitudinally with respect to the frame 10 and is pivotally secured at 292 at the tractor end thereof to a hand lever 294 which is itself secured to the frame 10 by means of a pivot plate 296.

The hand lever 294 is adapted to pivot in a vertical plane, the said plane being disposed longitudinally with respect to the frame 10.

As thus described, an urging of the hand lever 294 in a direction away from the tractor 12 will cause the pulley 258 to engage the clutch plate 280 for causing rotation of the shaft 282 in one direction in response to rotation of the power take-off shaft 20.

A pulling of the lever 294 toward the tractor 12 will cause the pulley 260 to engage the clutch plate 280 and, because the belt of the pulley 260 is crossed, this will cause the shaft 282 to rotate in an opposite direction for purposes later described.

That end of the shaft 282 which is disposed away from the tractor is provided with a pulley wheel 300, which latter is rotatably secured to an upper pulley wheel 302 by means of a belt 304.

The upper pulley 302 is keyed to a shaft 310 which latter is rotatably mounted upon the frame 10 in a normally horizontal position, longitudinally with respect to the frame 10. A forward end of the shaft 310 is drivably secured to a bevel gear 312 by means of a driving pinion 314.

The bevel gear 312 is rotatably secured to the frame 10 and is keyed to a screw-shaft 316. The screw-shaft 316 is vertically disposed normally and is also rotatably secured with respect to the frame 10 at its lower end. The screw-shaft 316 is disposed through a threaded aperture in a slidable block or cross head 317, which latter is secured around and to the shaft 120 and housing 122 as best seen in Figure 1.

The cross head 317 is horizontally disposed and its ends move upwardly and downwardly in tracks or rails 319, which latter are vertically disposed spaced apart channel iron frame members.

The housing 122 is provided with suitable side brackets 320 composed of two parts secured together by means of bolts 330. The purpose of the brackets 320 is to attach the semi-circular apertured member 148 to the slidable block 334, as best shown in Figure 2.

When the device of this invention is used with a circular saw blade 94, attached thereto, the lever 130 is swung so that the shaft 90 is disposed in a horizontal plane. At such time, an operator will secure a log guide, generally indicated at 350 to the housing 112.

The saw guide 350 is provided with a handle 354 at one end thereof and is provided with a channel 356 in the other, wide end thereof, the channel 356 comprising an elongated slot.

As thus described, the wide end of the guide 350 is substantially of a U-shape in cross-section for receiving the teeth of the blade 94 as later described.

Midway between the handle 354 and the opposite end of the guide, lugs 360 are secured transversely of the elongated guide 350 and at opposite side edges thereof for holding a piece of cordwood 370 against the blade 94.

At its channeled end the guide is provided with a bolt 372 secured therethrough and extending transversely outwardly therefrom. The bolt 372 is provided with four apart arms 390 extending in spaced apart pairs forwardly therefrom toward the housing 112.

The arms 390 are provided with apertures therein at their forward ends for purposes of facilitating the securing the forward ends of the arms 390 by means of bolts 396 to a pair of apertured lugs 400, which latter extend longitudinally of the housing 112 and are disposed on opposite sides of the latter.

To maintain the frame 10 relatively rigid when in a position extending directly rearwardly from the tractor 12 two cables 408 are secured at opposite sides of the frame 10. Each cable 408 is attached at its forward end to the drum mounting member 42 as best seen in Figure 1. At its rearward end each cable 408 is secured to the frame 10 by means of shock absorbing springs 410 and turnbuckles 412.

In operation, it will be seen that the assembly of this invention can be employed for sawing a piece of cord-wood by swinging the lever 130 until the circular blade 94 is disposed in a vertical plane, placing logs upon the guide 350 beneath the lugs 360, as best shown in Figure 6. The lever handle 354 may then be pushed forwardly and upwardly until the saw blade 94 has passed through the log or piece of cordwood 370 and into the channel 356.

Also, it will be seen that when the assembly is to be used for digging post holes, the auger 98 may be secured to the tool shaft 92 and holes may be dug by causing downward movement of the shaft 90 by manipulation of the hand lever 294 which causes rotation of the screw-shaft 316.

Opposite manipulation of the hand lever 294 will cause the auger 98 to raise from the ground. At such time, a fence wire may be secured to the drum 104 and rotations thereof will cause the fence wire to be wound and drawn taut. It will also be seen that at such time as the fence wire is taut, the rotation of the shaft 90 may be stopped since the ratchet 110 and pawl 114 will cooperate to prevent rotation of the drum 104 and release of the wound wire.

It will be seen that this invention has provided a tractor assembly particularly adapted for use in sawing post hole digging, fence wire stretching, tree felling, and many other uses.

From the foregoing description, it is thought to be obvious that a tractor attachment assembly constructed in accordance with my invention is particularly adapted for use by reason of the convenience and facility with which it may be assembled and operated, and it will also be obvious that my invention is susceptible of some change and modification including variations in the shape and size of the parts without departing from the principles and spirit thereof, and for this reason I do not wish to be understood as limiting myself to the precise arrangement and formation of the several parts herein shown in carrying out my invention in practice, except as claimed.

I claim:

1. In a power attachment for a tractor, the combination which comprises a horizontally disposed frame having upper and lower parallel sections with vertically aligned king pin openings in the inner ends and having a vertically disposed frame carried on the outer end with spaced parallel tracks in the said vertically disposed frame, mounting brackets for attaching the frame to a rear axle housing of a tractor with king pins carried thereby and pivotally mounted in the said king pin openings of the upper and lower sections of the frame, a cross head having a tool carrying head extended outwardly therefrom slidably mounted in the tracks of the vertically disposed frame, a driving shaft with universal joints therein journaled in the horizontally disposed frame with means connecting the inner end of the shaft to the power take off of a tractor on which the mounting brackets are attached and with the outer end extended into the said tool carrying head, tool mounting and actuating means positioned in the said tool carrying head and operatively connected to the driving shaft, elevating means for raising and lowering the cross head and tool carrying head, and means actuating the elevating means by the said driving shaft.

2. In a power attachment for a tractor, the combination which comprises a horizontally disposed frame having parallel upper and lower sections with vertically aligned kind pin openings in the inner ends and having a vertically disposed frame carried on the outer end with spaced parallel vertically disposed tracks therein, mounting brackets pivotally connected by king pins to the upper and lower sections of the frame through the said king pin openings thereof, a cross head having a tool carrying head extended outwardly therefrom slidably mounted in the tracks of the vertically disposed frame, a driving shaft with universal joints therein journaled in the horizontally disposed frame with connecting means on the inner end of the shaft, means journaling the outer end of the said driving shaft in the tool carrying head, said tool carrying head having an arm extended therefrom positioned perpendicular to the axis of the said driving shaft, tool mounting and actuating means carried by the arm and operatively connected to the driving shaft, elevating means for raising and lowering the cross head and tool carrying head, means actuating the elevating means by the driving shaft, and means rotating the said tool carrying head, means actuating the elevating means by the driving shaft, and means rotating the said tool carrying head to adjust the said arm and tool mounting and actuating means from vertical to horizontal and also to intermediate positions.

3. In a power attachment for a tractor, the combination which comprises a horizontally disposed frame having parallel upper and lower sections with king pin openings in the inner ends and having a vertically disposed frame carried on the outer end with spaced parallel vertically disposed tracks therein, mounting means carried by the inner ends of the upper and lower sections of the frame and pivotally connected thereto by king pins in the said king pin openings, a cross head having a tool carrying head extended outwardly therefrom slidably mounted in the tracks of the vertically disposed frame, a driving shaft with universal joints therein journaled in the horizontally disposed frame with connecting means on the inner end of the shaft, means journaling the outer end of the said driving shaft in the tool carrying head, said tool carrying head having an arm extended therefrom positioned perpendicular to the axis of the end of the driving shaft positioned in the tool carrying head, tool mounting and actuating means carried by the arm and operatively connected to the driving shaft, a vertically positioned screw journaled in the vertically disposed frame and threaded in a portion of the said cross head, a counter-shaft journaled on the upper section of the horizontally disposed frame, means driving the counter-shaft from the driving shaft, means rotating the said vertically positioned screw by the counter-shaft, means reversing the direction of rotation of the counter-shaft and screw, and means rotating the said tool carrying head to adjust the said arm from vertical to horizontal and also to intermediate positions.

4. In a power attachment for a tractor, the combination which comprises a horizontally disposed frame having parallel upper and lower sections with vertically aligned king pin openings in the inner ends and having a vertically disposed frame carried on the outer end with spaced parallel vertically disposed tracks therein, mounting brackets pivotally connected by king pins to the upper and lower sections of the frame through the said king pin openings thereof, a cross head having a tool carrying head extended outwardly therefrom slidably mounted in the tracks of the vertically disposed frame, a driving shaft with universal joints therein journaled in the horizontally disposed frame with connecting means on the inner end of the shaft, means journaling the outer end of the said driving shaft in the tool carrying head, said tool carrying head having an arm extended therefrom positioned perpendicular to the axis of the end of the driving shaft positioned in the tool carrying head, tool mounting and actuating means carried by the arm and operatively connected to the driving shaft, elevating means for raising and lowering the cross head and tool carrying head, means rotating the tool carrying head to adjust the position of the arm and tool mounting and actuating means from vertical to horizontal and also to intermediate positions, and means swinging the said frame laterally about the said king pins.

MELVIN MABRY.

REFERENCES CITED

The following references are of record in the file of this patent:

UNITED STATES PATENTS

| Number | Name | Date |
|---|---|---|
| 1,484,923 | Zander | Feb. 26, 1924 |
| 1,542,720 | Phillips | June 16, 1925 |
| 1,571,077 | Washa | Jan. 26, 1926 |
| 1,580,043 | Hoel | Apr. 6, 1926 |
| 1,589,481 | Obernuefemann | June 22, 1926 |
| 1,595,446 | Borton | Aug. 10, 1926 |
| 1,622,704 | Coil | Mar. 29, 1927 |
| 2,312,287 | Renner | Feb. 23, 1943 |
| 2,321,680 | Houston | June 15, 1943 |